(12) United States Patent
Katsuda et al.

(10) Patent No.: US 7,328,914 B2
(45) Date of Patent: Feb. 12, 2008

(54) INFLATOR

(75) Inventors: Nobuyuki Katsuda, Himeji (JP);
Haruhiko Yamashita, Himeji (JP)

(73) Assignee: Daicel Chemical Industries, Ltd.,
Sakai-shi, Osaka (JP)

( * ) Notice: Subject to any disclaimer, the term of this patent is extended or adjusted under 35 U.S.C. 154(b) by 391 days.

(21) Appl. No.: 10/854,247

(22) Filed: May 27, 2004

(65) Prior Publication Data

US 2005/0035581 A1    Feb. 17, 2005

Related U.S. Application Data

(60) Provisional application No. 60/474,958, filed on Jun. 3, 2003.

(30) Foreign Application Priority Data

May 29, 2003    (JP)    ............................... 2003-151887

(51) Int. Cl.
*B60R 21/26* (2006.01)

(52) U.S. Cl. ...................... 280/736; 280/737; 280/740; 280/741

(58) Field of Classification Search ............................... 102/202.5–202.14, 530; 280/736, 737, 740, 280/741, 742
See application file for complete search history.

(56) References Cited

U.S. PATENT DOCUMENTS

| | | | | |
|---|---|---|---|---|
| 5,462,307 A | * | 10/1995 | Webber et al. ............... | 280/737 |
| 5,615,912 A | * | 4/1997 | O'Loughlin et al. ......... | 280/737 |
| 5,655,790 A | * | 8/1997 | Faigle et al. ................. | 280/737 |
| 5,685,558 A | * | 11/1997 | Cuevas ........................ | 280/728.2 |
| 5,794,973 A | | 8/1998 | O'Loughlin et al. | |
| 6,039,348 A | | 3/2000 | Niederman et al. | |
| 6,142,514 A | * | 11/2000 | Yamato et al. ............... | 280/736 |
| 6,196,583 B1 | * | 3/2001 | Ruckdeschel et al. ....... | 280/736 |
| 6,231,078 B1 | * | 5/2001 | Kokeguchi .................. | 280/736 |
| 6,237,498 B1 | * | 5/2001 | Winterhalder et al. ...... | 102/530 |
| 6,253,683 B1 | | 7/2001 | Fukabori | |
| 6,289,820 B1 | | 9/2001 | Anacker et al. | |
| 6,295,935 B1 | | 10/2001 | Swann et al. | |
| 6,488,310 B1 | * | 12/2002 | Ryobo et al. ................ | 280/736 |
| 6,499,764 B2 | | 12/2002 | Anacker et al. | |
| 6,676,157 B2 | | 1/2004 | Nanbu | |
| 6,814,371 B2 | * | 11/2004 | Welz ............................ | 280/736 |
| 2001/0017461 A1 | | 8/2001 | Yamato et al. | |

(Continued)

FOREIGN PATENT DOCUMENTS

DE    10114020 A1    10/2002

(Continued)

OTHER PUBLICATIONS

"Dual Path Airbag Inflator," Research Disclosure, Mason Publications, Hampshire, GB, vol. 439, No. 96, Nov. 2000.

*Primary Examiner*—Eric Culbreth
(74) *Attorney, Agent, or Firm*—Birch, Stewart, Kolasch & Birch LLP

(57) ABSTRACT

An inflator comprises one igniter 36 and first and second gas discharge ports 34 and 46 disposed separately. After the first rupturable plate 38 is broken by an activation of the igniter 36, breaking energy moves inside the transfer tube 24, so that the second rupturable plate 48 is broken.

13 Claims, 5 Drawing Sheets

U.S. PATENT DOCUMENTS

2003/0071447 A1* 4/2003 Ogawa et al. ............... 280/741
2003/0178827 A1    9/2003 Dinsdale et al.

FOREIGN PATENT DOCUMENTS

| | | |
|---|---|---|
| JP | 8-268211 A | 10/1996 |
| JP | 2001-506562 A | 5/2001 |
| JP | 2002-504046 A | 2/2002 |
| JP | 2002-276896 A | 9/2002 |
| WO | WO 97/08020 A1 | 3/1997 |
| WO | WO 97/32753 A1 | 9/1997 |

* cited by examiner

INFLATOR

This Nonprovisional application claims priority under 35 U.S.C. § 119(e) on U.S. Provisional Application No. 60/474,958 filed on Jun. 3, 2003 and under 35 U.S.C. § 119(a) on Patent Application No. 2003-151887 filed in Japan on May 29, 2003, the entire contents of which are hereby incorporated by reference.

BACKGROUND OF THE INVENTION

1. Field of the Invention

The present invention relates to an inflator suitable as an inflator for an air bag for a side collision disposed in an automobile in particular.

2. Description of the Related Invention

Various kinds of inflator such as an inflator for an air bag of a driver side, an inflator for an air bag of a front passenger side, an inflator for an air bag for a side collision, an inflator for a curtain air bag, an inflator for a knee bolster, an inflator for an inflatable seat belt, an inflator for a tubular system, and an inflator for a pretensioner are known as an inflator for an inflation type security system of a motor vehicle, which are for protecting a vehicle occupant most suitably according to a seat location in a vehicle such as a driver side, a front passenger side, etc.

Among these inflators, since an installation location of an inflator for an air bag for a side collision is limited as compared to an inflator for an air bag of a driver side or a front passenger side, there are many demands with respect to wiring work to connect an igniter of an inflator to a power source of an automobile, in addition to demands with respect to shape, size, function etc.

As related art to the present invention, WO97/08020, WO97/32753, U.S. Pat. No. 5,794,973, and U.S. Pat. No. 6,039,348 can be quoted.

SUMMARY OF THE INVENTION

The present invention provides an inflator, especially an inflator suitable for an air bag for a side collision, in which direction of air bag inflation and development can be controlled easily and wiring work between an igniter of an inflator and a power source of an automobile can be also controlled easily.

One aspect of the present invention provides, as means for solving the problem, an inflator comprising a tubular inflator housing, an ignition means chamber connected to one end of the tubular inflator housing and a diffuser portion connected to the other end of the tubular inflator housing, wherein the ignition means chamber includes an igniter and a gas discharge port, and by a first rupturable plate closes between the inside of the inflator housing and the ignition means chamber, the diffuser portion has a gas discharge port, a second rupturable plate closes between the inside of the inflator housing and the diffuser portion, and a pressurized gas is charged under a high pressure inside the tubular inflator housing.

In the inflator of the present invention, since gas discharge ports are disposed separately at both end portions, as compared to a case where gas discharge ports are arranged only at one end portion, in inflation and development of an air bag, development in the vertical and/or horizontal direction and a developing speed can be controlled easily. Also, it is possible to introduce gas into different air bags to inflate them simultaneously, or to introduce gas into one air bag through two different portions to inflate the air bag uniformly in the vertical and/or horizontal direction.

Further, in the inflator of the present invention, since the igniter is installed only at one end portion, a lead wire connected to a power source (battery) is drawn from only one portion, so that, as compared to a case of an inflator having two igniters, wiring work can be performed easily and only a small space is needed.

Charging pressure of a pressurized gas (e.g., inert gas such as argon, helium, nitrogen gas and so on) charged into the inflator housing is different by kinds of inflator etc., but when applied to an inflator for an air bag of an automobile, the maximum pressure is about 70,000 kPa.

The invention may be provided with leading means adapted to direct a breaking energy for breaking the second rupturable plate in a space from the first rupturable plate to the second rupturable plate in the tubular inflator housing, and by activation of the igniter accommodated in the ignition means chamber, the first rupturable plate is broken first and then, the second rupture is broken later.

The leading means adapted to direct a breaking energy for breaking the second rupturable plate is a tube disposed in a space from the first rupturable plate to the second rupturable plate, and it is preferable that the breaking energy is transferred through the tube.

In the present invention, "in a space from the first rupturable plate to the second rupturable plate" means from a position contacting with or in the vicinity of the first rupturable plate, to a position contacting with or in the vicinity of the second rupturable plate. The same applies to each invention below.

In order to eject the pressurized gas through gas discharge ports disposed separately, it is necessary to break the first and second rupturable plates and to make the pressurized gas, which is charged under a high pressure in the inflator housing, movable. Here, since the first rupturable plate is placed in the vicinity of the igniter, it is easily ruptured. However, since the second rupturable plate is apart from the igniter, it becomes important to enhance breaking certainty.

Thus, when two rupturable plates are broken by a single igniter, breakage of the second rupturable plate is highly secured by arranging the leading means adapted to direct a breaking energy for breaking the second rupturable plate, preferably a tube disposed between the first rupturable plate and the second rupturable plate.

The present invention may also be provided with leading means adapted to direct a breaking energy for breaking the second rupturable plate in a space from the first rupturable plate to the second rupturable plate in the tubular inflator housing, and further a movable body moving on receiving the breaking energy and colliding with the second rupturable plate, and, by activation of the igniter accommodated in the ignition means chamber, the first rupturable plate is broken first and the second rupturable plate is broken later.

The leading means adapted to direct a breaking energy for breaking the second rupturable plate is a tube disposed in a space from the first rupturable plate to the second rupturable plate, and it is preferable that the movable body is disposed in the tube and it moves in the tube on receiving the breaking energy to collide with the second rupturable plate.

In the present invention, when two rupturable plates are broken by a single igniter, breakage of the second rupturable plate is highly secured by arranging the movable body together with the leading means adapted to direct a breaking energy for breaking the second rupturable plate, preferably a tube disposed in a space from the first rupturable plate to the second rupturable plate.

Since this movable body is to collide with the second rupturable plate to break the same, for example, one which is made of the same metal as that of the second rupturable plate and has a sharp arrowhead-like top can be used.

In the present invention, in which the leading means adapted to direct a breaking energy for breaking the second rupturable plate is arranged from a position of the first rupturable plate to a position of the second rupturable plate in the tubular inflator housing, the leading means adapted to direct a breaking energy may be a detonating cord, and the first rupturable plate is broken first and the second rupturable plate is broken later.

The detonating cord comprises a thin metal tube charged with gunpowder, and an example thereof is disclosed in JP-A 11-263185 and so on.

The detonating cord may be disposed such that one end is in a position contacting with or in the vicinity of the first rupturable plate and the other end is in a position contacting with or in the vicinity of the second rupturable plate. In addition, the detonating cord can be disposed in the inflator housing as it is, or it can be disposed in the tube disposed in a space from the first rupturable plate to the second rupturable plate.

In the invention of claim 6, when two rupturable plates are broken by a single igniter, breakage of the second rupturable plate is highly secured by arranging the detonating cord as a leading means adapted to direct a breaking energy for breaking the second rupturable plate.

In the present invention, in which a leading means adapted to direct a breaking energy for breaking the second rupturable plate is arranged in a space from the first rupturable plate to the second rupturable plate in the tubular inflator housing, the leading means adapted to direct a breaking energy may be a rod-shaped body disposed in a space from the first rupturable plate to the second rupturable plate, the rod-shaped body moves on receiving breaking energy to collide with the second rupturable plate, and the first rupturable plate is broken first and the second rupturable plate is broken later.

In the present invention, when two rupturable plates are broken by a single igniter, breakage of the second rupturable plate is highly secured by arranging the rod-shaped body as a leading means adapted to direct a breaking energy for breaking the second rupturable plate.

In the present invention, the total opening areas of gas discharge ports on both sides may be different.

By thus making the total opening areas of gas discharge ports arranged on both sides different, an ejecting speed (an ejecting amount) of the pressurized gas ejected from each gas discharge port can be adjusted. Such an inflator can easily deal with differences in shape, size, and developing direction of an air bag (in the vertical and longitudinal directions) varying in kinds of car and inflator.

The inflator of the present invention can be applied to publicly known inflators for air bags, for example, an inflator for an air bag of a driver side, an inflator for an air bag of a front passenger side, an inflator for an air bag for a side collision, an inflator for a curtain air bag, and in particular, it is suitable to an inflator for an air bag for a side collision.

The inflator of the present invention has a single igniter and gas discharge ports disposed separately at both ends. Thus, development in the vertical and/or longitudinal direction and a developing speed can be controlled easily, in addition, as compared to a case of an inflator having two igniters, wiring work is facilitated and only a small space for wiring is needed. Therefore, it is particularly suitable as an inflator for an air bag for a side collision whose installation position is limited.

DETAILED DESCRIPTION OF THE INVENTION (1) First Embodiment

Figure 1:
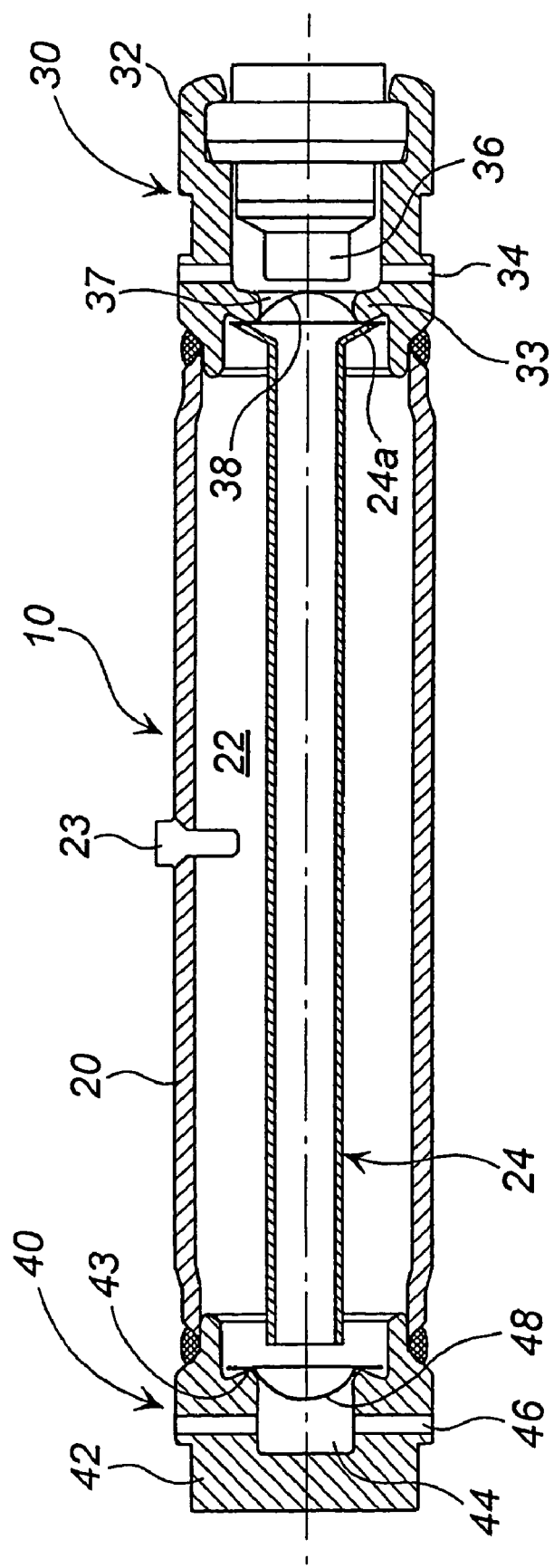
FIG. 1 is an axial cross section of an inflator of the present invention.

The first embodiment will be explained according to FIG. 1. FIG. 1 is a cross section in an axial direction of an inflator.

An inflator 10 comprises a tubular inflator housing 20 made of highly pressure resistant metal such as steel, an ignition means chamber 30 connected to one end of the housing 20, and a diffuser portion 40 connected to the other end. The ignition means chamber 30 and the diffuser portion 40 may be made of stainless, aluminum and so on.

In FIG. 1, the inflator housing 20, the ignition means chamber 30, and the diffuser portion 40 are separate members, but the entirety of three members can be formed of a single member (for example, the inflator housing forms the whole outer shell) and each portion can be separated by a partition wall and a rupturable plate.

An inner space 22 of the inflator housing 20 is kept in an airtight state, and argon, helium, nitrogen etc. is charged therein under a high pressure.

An existing gas cylinder can be utilized as the inflator housing 20, which can be manufactured by swaging the pipe. In the inflator 10 of FIG. 1, the ignition means chamber 30 is connected to one end of the inflator housing 20, the diffuser portion 40 is connected to the other end, rupturable plates are arranged to keep the airtight state, and then, a pressurized gas is charged through an opening in the housing 20, a seal pin 23 in inserted in the opening, and thereafter, the seal pin 23 is welded to the housing 20.

As to the ignition means chamber 30, an outer shell is formed by an ignition means chamber housing 32. In the ignition means chamber housing 32, a plurality of first gas discharge ports 34 for ejecting the pressurized gas outside is arranged, and an igniter 36 comprising a priming is accommodated. The igniter 36 is adapted to be connected to a power source (a battery of an automobile) via a connector and a lead wire (not shown).

In a first passage 37 formed between the inflator housing 20 (inner space 22) and the ignition means chamber 30, a first rupturable plate 38 made of stainless is arranged. The inside of the ignition means chamber 30 is under a normal (atmosphere) pressure since the first passage 37 is closed by the first rupturable plate 38. The first rupturable plate 38 is fixed to the ignition means chamber 30 by welding a circumferential edge portion of the first rupturable plate 38 to a first circular portion 33 obtained by radially protruding an inner surface of the ignition means chamber housing 32.

As to the diffuser portion 40, an outer shell is formed by a diffuser housing 42 and a second passage 44 is arranged inside. In the diffuser housing 42, a plurality of second gas discharge ports 46 for ejecting a pressurized gas outside is arranged.

Between the inflator housing 20 (inner space 22) and a second passage 44, the second rupturable plate 48 made of stainless is arranged. The inside of the diffuser portion 40 is under an ambient (atmosphere) pressure since the second passage 44 is closed by the second rupturable plate 48. The second rupturable plate 48 is fixed to the diffuser portion 40 by welding a circumferential edge portion of the second rupturable plate 48 to a second circular portion 43 obtained by axially protruding an inner surface of the diffuser housing 42.

The inflator housing 20 and the ignition means chamber 30, and the inflator housing 20 and the diffuser 40 are connected by welding as shown in FIG. 1.

In the inflator housing 20, a transfer tube 24 is arranged, as leading means for leading a breaking energy for breaking the second rupturable plate 48, in the inner space 22 and extending between the first rupturable plate 38 and to the second rupturable plate 48. In one end opening portion of the transfer tube 24, a flange portion 24a is fixed to the ignition means chamber 30 by welding it to the first circular portion 33 together with the first rupturable plate 38, but the other end is not fixed and not joined to the second rupturable plate 48. Thereby, since the pressurized gas also exists inside the transfer tube 24, a pressure in the transfer tube 24 is the same as that in the inner space 22.

The first gas discharge ports 34 arranged in the ignition means chamber 30 and the second gas discharge ports 46 arranged in the diffuser portion 40 can be the same or different in a total opening area in accordance with a kind of an applied inflator for an air bag and so on.

For example, when development of an air bag to one direction side is mainly demanded, a developing direction of an air bag can be controlled by increasing the total opening area of the first gas discharge ports 34 to increase an ejection amount of gas. In this case, by adjusting directions of the first gas discharge port 34 and the second gas discharge ports 46, a developing direction of an air bag can be controlled more easily.

Additionally, in case of using two air bags, if one air bag is connected to the first gas discharge port 34, the other air bag is connected to the second gas discharge port 46, and an opening area of the air bag which is to be inflated and developed primarily (for example, the air bag connected to the second gas discharge port 46) is made bigger, the air bag connected to the second gas discharge port 46 can be inflated and developed prior to the other air bag.

Next, operation of the inflator 10 shown in FIG. 1 will be explained. When the first rupturable plate 38 is broken by an activation of the igniter 36, breaking energy (mainly, a pressure produced by combustion of a priming) moves inside the transfer tube 24 instantly and collides with the second rupturable plate 48 to break the same.

Then, the pressurized gas charged under a high pressure in the inner space 22 flows into the ignition means chamber 30 through the transfer tube 24 and ejected from the first gas discharge port 34, and also, it flows into the second passage 44 and ejected from the second gas discharge port 46. In this case, by arranging a flange portion 24a at one end of the transfer tube 24 to fall off from the first circular portion 33 (but not to hinder movement of the breaking energy inside the transfer tube 24), the pressurized gas directly flows into the ignition means chamber 30 to be ejected from the first gas discharge port 34.

In such an inflator 10, since the first gas discharge port 34 and the second gas discharge port 46 are disposed separately at both end portions, as compared to a case where gas discharge ports are arranged only at one end portion, in inflation and development of an air bag, development in the vertical and/or horizontal direction and a developing speed can be controlled more easily. Also, it is possible to introduce gas into different air bags to inflate them simultaneously, or to introduce gas into one air bag through two different portions to inflate the air bag uniformly in the vertical and/or horizontal direction.

Further, in the inflator 10, since the igniter 36 is installed only at one end portion and a lead wire connected to a power source (a battery) is drawn from only one portion, as compared to a case of providing two igniters, wiring work can be performed easily and only a small space for wiring is needed.

(2) Second Embodiment

Figure 2:
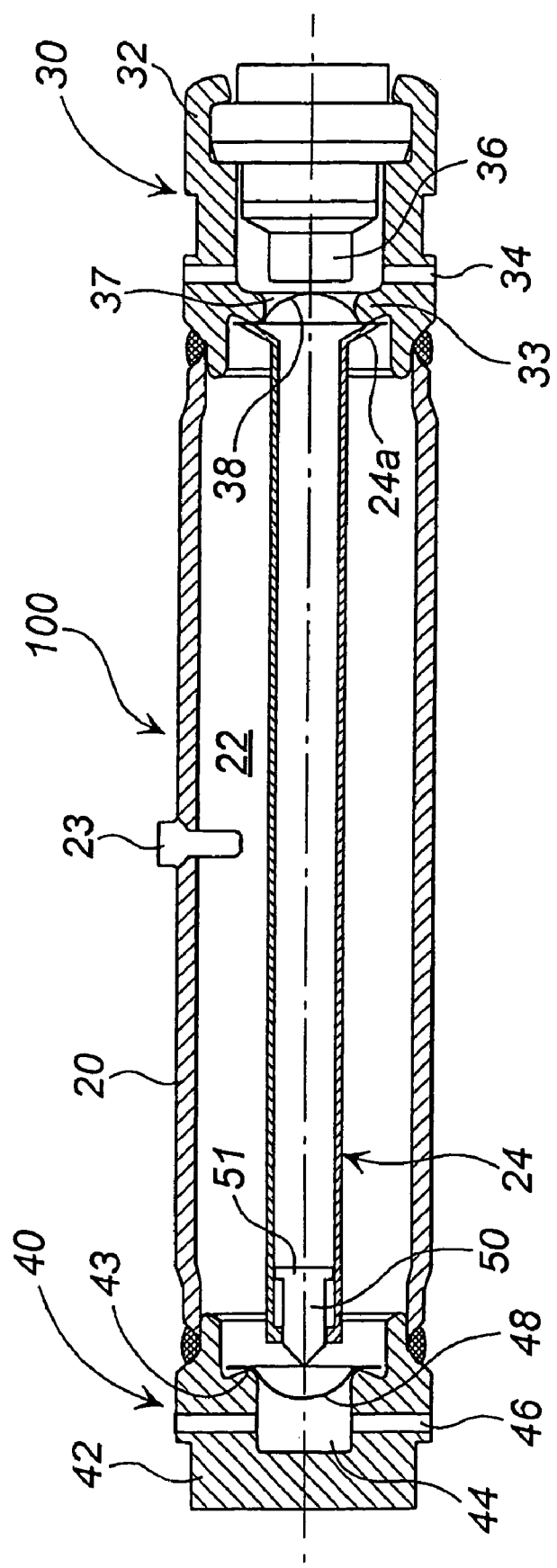
FIG. 2 is an axial cross section of an inflator of the present invention.

The second embodiment will be explained according to FIG. 2. FIG. 2 is a cross section of an inflator in an axial direction. Since the inflator 100 shown in FIG. 2 and the inflator 10 shown in FIG. 1 have almost the same structure, the same parts are applied with the same numerals as in FIG. 1, and explanation thereof is omitted. Mainly, different parts will be explained.

In the inflator housing 20, a transfer tube 24 is arranged as a leading means adapted to direct a breaking energy for breaking the second rupturable plate 48, in an inner space 22 and extends between the first rupturable plate 38 and the second rupturable plate 48.

In the transfer tube 24, a movable body (a check valve pin) 50 is inserted such that it can move freely in an axial direction of the transfer tube 24. The movable body 50 is made of stainless, which is similar to the rupturable plate, and formed into an arrowhead shape with a sharp top.

By the way, after the second rupturable plate 48 is broken, the whole movable body 50 flying out of the transfer tube 24, and due to the outflow of the pressurized gas, close the opening area of the broken second rupturable plate 48

Accordingly, it is preferable that a base portion 51 (a portion opposite to the top) is provided with a flange, such that an interior circumferential surface of the transfer tube 24 engages with the flange, so that the base portion 51 remains in the transfer tube 24 when the top of the movable body 50 collides with the second rupturable plate 48. Here, the transfer tube 24 and the movable body 50 (base portion 51) are arranged such that, prior to an activation of the inflator 100, the pressurized gas flows into the transfer tube 24, and also, after activation of the inflator 100, the pressurized gas passes through the transfer tube 24 and discharged from the first gas discharge port 34.

Next, operation of the inflator 100 shown in FIG. 2 will be explained. When the first rupturable plate 38 is broken by an activation of the igniter 36, the breaking energy (mainly, a pressure produced by combustion of a priming) moves inside the transfer tube 24 instantly. The movable body 50 receives the breaking energy moving in the transfer tube 24 and moves toward the second rupturable plate 48 and breaks the same. The same operation as that of the inflator 10 in FIG. 1 follows afterwards.

(3) Third Embodiment

Figure 3:
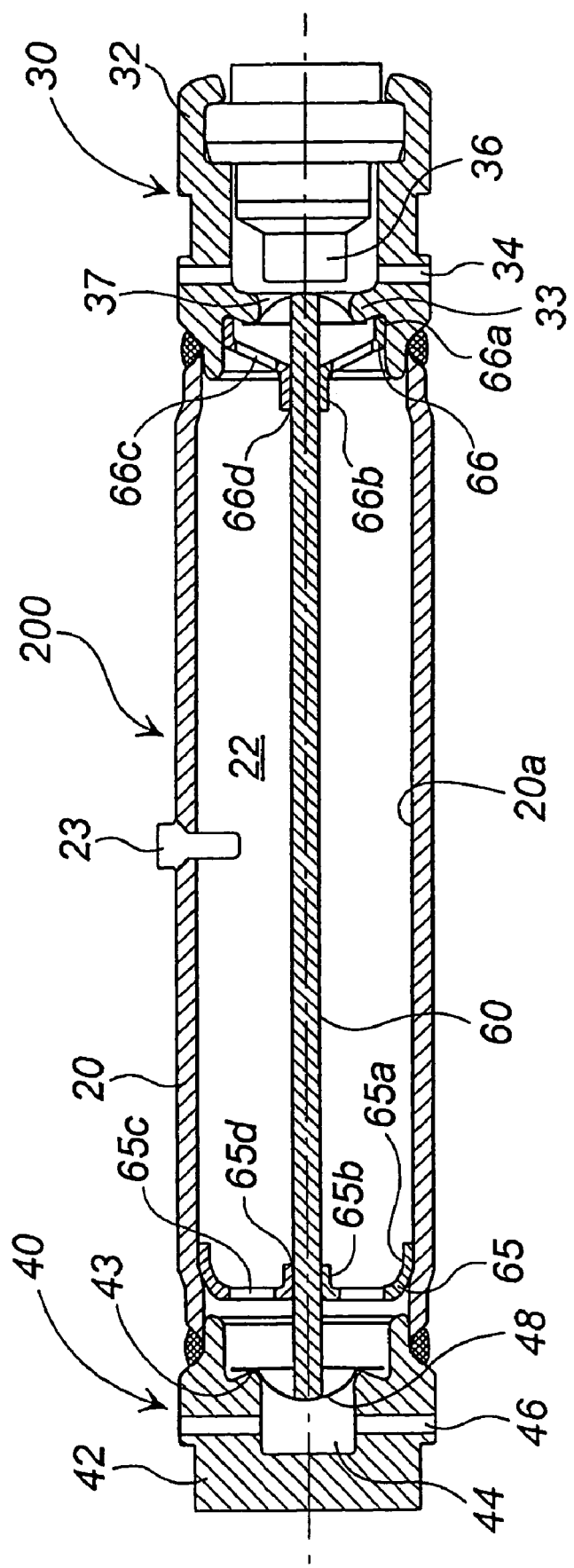
FIG. 3 is an axial cross section of an inflator of the present invention.

The third embodiment will be explained according to FIG. 3. FIG. 3 is a cross section of an inflator in an axial direction. Since the inflator 200 shown in FIG. 3 and the inflator 10 shown in FIG. 1 have almost the same structure, the same parts are applied with the same numerals as in FIG. 1, and explanation thereof is omitted. Mainly, different parts will be explained.

In the inflator housing 20, a detonating cord 60 is as arranges, as a leading means adapted to direct a breaking energy for breaking the second rupturable plate 48 in an inner space 22 and extends between from the first rupturable plate 38 and the second rupturable plate 48.

The detonating cord 60 comprises a stainless thin tube charged with explosives, and is supported and fixed by retainers 65 and 66 disposed in the vicinity of the both end portions of the inflator housing 20 as shown in the drawing.

The retainer 65 presses against an interior circumferential surface 20a of the inflator housing at a circular exterior circumference wall 65a and presses against the detonating cord 60 at a circular interior circumference wall 65b, while the retainer 66 presses against the interior circumferential surface 20a of the inflator housing at a circular exterior circumference wall 66a, and the detonating cord 60 at a circular interior circumference wall 66b, thereby supporting and fixing the detonating cord 60.

In the retainers 65 and 66, vents 65c and 66c are provided respectively to allow the pressurized gas flow smoothly, and further, supporting ports 65d and 66d (the ports surrounded by the respective circular interior circumference walls 65b and 66b) are provided in the center portion to make the detonating cord 60 penetrate and support the same.

By press-fitting such retainers 65 and 66 through both end opening portions of the inflator housing 20 prior to installing the ignition means chamber 30 and the diffuser portion 40, the detonating cord 60 is disposed such that its one end side faces (not in contact with) or makes contact with the first rupturable plate 38, and the other end side faces (not in contact with) or makes contact with the second rupturable plate 48. In this case, shapes and structures of the retainers 65 and 66 can be appropriately changed as long as they can support and fix the detonating cord 60.

Figure 4:
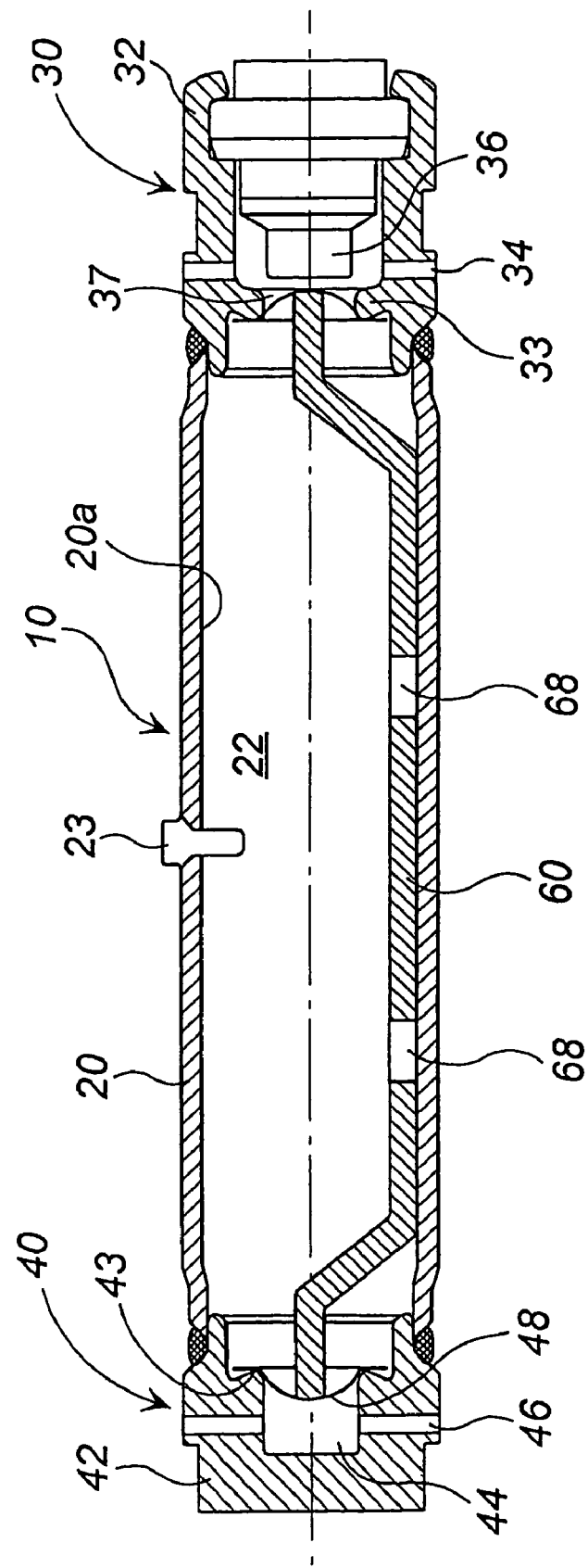
FIG. 4 is an axial cross section showing another embodiment of the inflator in FIG. 3.

Also, as a fixing method of the detonating cord 60, it can be disposed such that its one end side faces (not in contact with) or makes contact with the first rupturable plate 38 and the other end side faces (not in contact with) or makes contact with the second rupturable plate 48, by providing the detonating cord 60 along the interior circumferential surface 20a of the inflator housing and fixing desired portions thereof with an adhesive or an adhesive tape 68 made of aluminum or stainless as shown in FIG. 4.

Next, operation of the inflators 200 shown in FIGS. 3 and 4 will be explained. When the first rupturable plate 38 is broken by an activation of the igniter 36, explosives in the detonating cord 60 are ignited and the second rupturable plate 48 is broken by explosive power of the gunpowder in the igniter 36. The same operation as that of the inflator 10 in FIG. 1 follows afterwards.

(4) Fourth Embodiment

Figure 5:
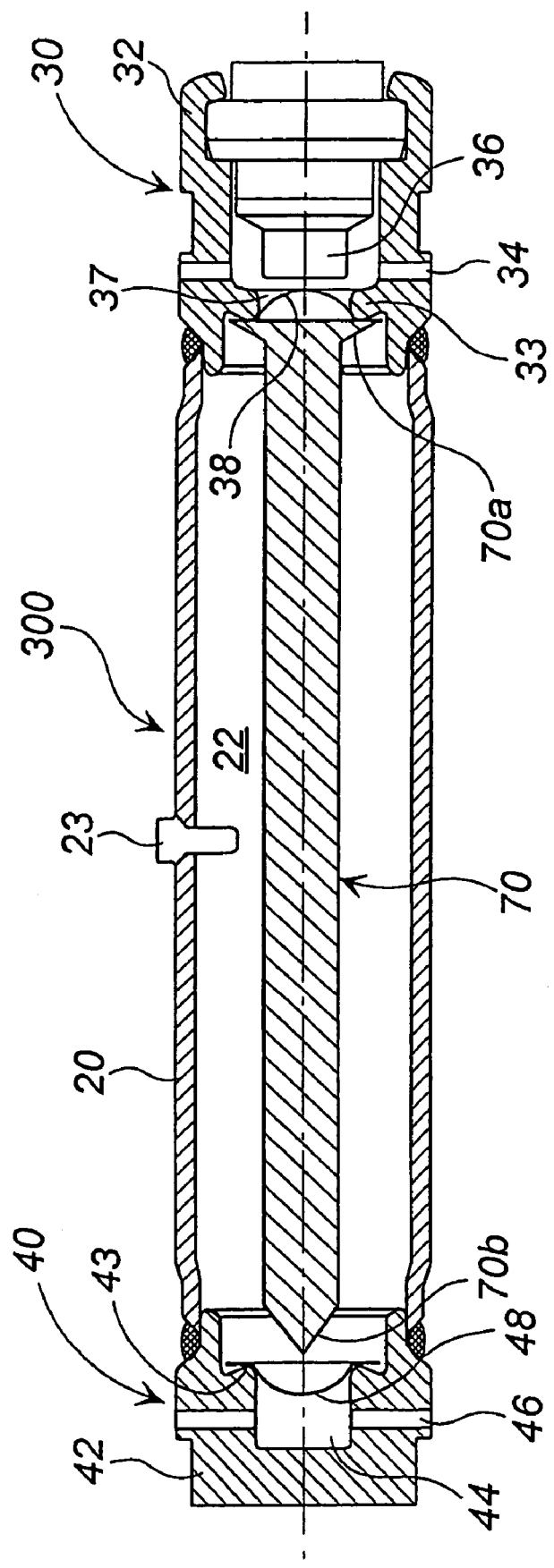
FIG. 5 is an axial cross section of an inflator of the present invention.

The fourth embodiment will be explained according to FIG. 5. FIG. 5 is a cross section of an inflator in an axial direction. Since the inflator 300 shown in FIG. 5 and the inflator 10 shown in FIG. 1 have almost the same structure, the same parts are applied with the same numerals as in FIG. 1, and explanation thereof is omitted. Mainly, different parts will be explained.

In the present embodiment, the combination of the transfer tube 24 and the movable body (check valve pin) 50 in FIG. 2 is replaced with a rod-shaped body.

In the inflator housing 20, a rod-shaped body 70 is disposed, as leading means adapted to direct a breaking energy for breaking the second rupturable plate 48, in an inner space 22 and extends between the first rupturable plate 38 and the second rupturable plate 48.

One end portion 70a of the rod-shaped body 70 is welded and fixed together with the first rupturable plate 38 at the first circular portion 33, but when the first rupturable plate 38 is broken by an activation of the igniter 36, the welded and fixed portion fall off easily. The other end portion 70b of the rod-shaped body 70 has a sharp arrowhead shape, such that it breaks the second rupturable plate 48.

Next, operation of the inflator 300 shown in FIG. 5 will be explained. When the first rupturable plate 38 is broken by an activation of the igniter 36, the rod-shaped body 70 receives a breaking energy (mainly, a pressure produced by combustion of a priming), moves in an axial direction of the inflator 300, and collides with the second rupturable plate 48 to break the same. The same operation as that of the inflator 10 in FIG. 1 follows afterwards.

The invention claimed is:

1. An inflator, comprising:
   a tubular inflator housing accommodating a pressurized gas therein;
   ignition means chamber housing defining an ignition means chamber and connected to one end of the tubular inflator housing, the ignition means chamber housing accommodating an igniter and defining a first gas discharge port that allows the ignition means chamber to communicate with an outside of the inflator;
   a diffuser portion connected to the other end of the tubular inflator housing, the diffuser portion defining a second gas discharge port;
   a first rupturable plate sealing a first passage between the ignition means chamber and an inside of the tubular inflator housing, the first passage being further provided such that the inside of the tubular inflator housing is in communication with the outside of the inflator through the first gas discharge port after activation of the inflator;
   a second rupturable plate sealing a second passage between an inside of the diffuser portion and the inside of the inflator housing; and
   leading means adapted to direct a breaking energy for breaking the second rupturable plate, the leading means being arranged in said inflator housing and extending between the first rupturable plate and the second rupturable plate,
   wherein, by activation of the igniter accommodated in the ignition means chamber, the first rupturable plate is broken first and the second rupturable plate is broken later.

2. The inflator as claimed in claim 1, wherein the leading means is a tube disposed in said inflator housing, and the breaking energy is transferred through the tube.

3. The inflator as claimed in claim 1,
   wherein said leading means includes a movable body adapted to move upon receiving the breaking energy and collide with the second rupturable plate.

4. The inflator as claimed in claim 3, wherein the leading means is a tube disposed in said inflator housing, and the movable body disposed in the tube moves upon receiving the breaking energy and collides with the second rupturable plate.

5. The inflator as claimed in claim 1, wherein the leading means is a rod-shaped body that moves upon receiving the breaking energy and collides with the second rupturable plate.

6. The inflator as claimed in claim 1, wherein the total opening areas of gas discharge ports on both sides are different.

7. The inflator as claimed in claim 1, wherein the igniter directly opposes the first rupturable plate in the ignition means chamber housing.

8. The inflator as claimed in claim 1, wherein the first gas discharge port is provided in a circumferential surface of the ignition means chamber housing, and the second gas discharge port is provided in a circumferential surface of the diffuser portion.

9. The inflator according claim 1, wherein the ignition means chamber housing accommodates only the igniter.

10. An inflator, comprising:
    a tubular inflator housing accommodating a pressurized gas therein;
    ignition means chamber housing defining an ignition means chamber and connected to one end of the tubular inflator housing, the ignition means chamber housing accommodating an igniter and defining a first gas discharge port that allows the ignition means chamber to communicate with an outside of the inflator;
    a diffuser portion connected to the other end of the tubular inflator housing, the diffuser portion defining a second gas discharge port;
    a first rupturable plate sealing a first passage between the ignition means chamber housing and the inflator housing;
    a second rupturable plate sealing a second passage between the diffuser portion and the inflator housing; and
    leading means adapted to direct a breaking energy for breaking the second rupturable plate, the leading means being arranged in said inflator housing and extending between the first rupturable plate and the second rupturable plate,
    wherein, by activation of the igniter accommodated in the ignition means chamber, the first rupturable plate is broken first and the second rupturable plate is broken later, and
    wherein the leading means is a detonating cord, and a first end of the detonating cord is in contact with a center portion of the second rupturable plate.

11. The inflator as claimed in claim 10, wherein a second end of the detonating cord is in contact with a center portion of the first rupturable plate.

12. The inflator as claimed in claim 10, wherein the detonating cord is supported by an inner surface of the tubular inflator housing.

13. An inflator, comprising:
    a tubular inflator housing accommodating a pressurized gas therein;
    ignition means chamber housing defining an ignition means chamber and connected to one end of the tubular inflator housing, the ignition means chamber housing accommodating an igniter and defining a first gas discharge port that allows the ignition means chamber to communicate with an outside of the inflator;
    a diffuser portion connected to the other end of the tubular inflator housing, the diffuser portion defining a second gas discharge port;
    a first rupturable plate sealing a first passage between the ignition means chamber housing and the inflator housing;
    a second rupturable plate sealing a second passage between the diffuser portion and the inflator housing; and
    leading means adapted to direct a breaking energy for breaking the second rupturable plate, the leading means being arranged in said inflator housing and extending between the first rupturable plate and the second rupturable plate,
    wherein, by activation of the igniter accommodated in the ignition means chamber, the first rupturable plate is broken first and the second rupturable plate is broken later, and
    wherein the leading means is a rod-shaped body, having an end portion, opposing the first rupturable plate, that increases in diameter as the end portion extends towards the first rupturable plate, the rod-shaped body moves towards the second rupturable plate upon receiving the breaking energy and collides with the second rupturable plate.

* * * * *